3,301,642
LOW FRICTION, POROUS, SINTERED BEARING CONTAINING A LEAD-TELLURIUM ALLOY
Hassan Youssef, Taverny, France, assignor to La Metallurgie Francaise des Poudres-Metafram, Paris, France, a company of France
No Drawing. Filed Mar. 17, 1965, Ser. No. 440,620
Claims priority, application France, Mar. 20, 1964, 968,097
6 Claims. (Cl. 29—182)

This invention is concerned with low friction materials of fine porosity suitable for use as bearing materials and is particularly concerned with self-lubricating bearing materials.

Self-lubricating bearings generally comprise a porous metal bearing surface supporting the rotating shaft, the diameter of the pores in the bearing material being very small, for example, less than 1.4 microns. The bearing is impregnated with oil, the surface tension of which is chosen in accordance with the size of the pores in the bearing material. For example, a bearing having pore sizes of up to 1.4 microns should be impregnated with an oil having a surface tension of about 35 dynes/cm.

Bearing materials of this type can be made by sintering a metallic powder of the required composition, the powder having a particle size of less than 10 microns, and preferably of approximately 5 microns. Iron and nickel powders having these particle sizes are commonly produced by the decomposition of their carbonyls and bearings made of iron and nickel generally give very satisfactory results. However, if the oil film between the bearing and the rotating shaft is ruptured as by some deformation occurring in the bearing, a violent seizure can occur as both iron and nickel have very poor anti-frictional qualities.

This disadvantage might be avoided by adding a metal having anti-frictional properties, such as lead, tin, bismuth, antimony or tellurium, to the bearing material. However, all these metals have low melting points and when a powder mixture containing these metals in particulate form is heated to a temperature sufficient to sinter the iron or nickel, they melt and coalesce and leave large voids or cavities in the bearing material. For example, one way of making such a bearing is to sinter a metal powder of the desired composition onto the inside of another porous ring which serves as a supporting or backing member for the inner bearing shell. Usually, the metal powder is coated on the inside of the ring in admixture with a temporary organic binder. The powder is then sintered onto the outer ring by heating; usually to a temperature of at least 600° C. in a non-oxidising atmosphere, e.g. in hydrogen. If the metal powder contains lead particles, they melt and coalesce and run into the outer porous ring when the temperature reaches about 327° C., the melting point of lead. If the lead powder (usually of 5 micron particle diameter) constitutes an appreciable portion of the powder mixture, the pores which are left behind by escape of the molten lead will have a diameter in excess of 1.4 microns and the bearing will not have the desired fine porosity.

I have now found that an alloy of lead and tellurium containing 55 to 75% of lead is suitable for the production of low friction materials of fine porosity when used in conjunction with another powdered metal, usually iron or nickel. The lead-tellurium alloy powder is used in the amount of 5 to 40% by weight of the total powder mixture.

According to the present invention, therefore, I provide a low friction material of fine porosity suitable for use as a bearing material, which consists of a sintered metal powder mixture, the powder mixture comprising 5 to 40% by weight a powdered lead-tellurium alloy containing 55 to 75% by weight of lead, and at least one other powdered metal and said powder mixture having been sintered at a temperature below the melting point of the lead-tellurium alloy.

Alloys of lead and tellurium containing 62% by weight of lead forming a peritectic composition, the melting point of which is 917° C. As this temperature is considerably higher than the sintering temperature normally used in the production of sintered bearing materials, it is possible to use alloys which contain percentages of lead close to this figure and which still have melting points in excess of the temperatures it is desired to use. I have found that the permissible range of lead content in the alloy is from 55 to 75% by weight.

The alloy may contain up to 10% of other metals having anti-frictional properties such as tin, bismuth and antimony. However, the alloy as a whole should contain the specified amount of lead in order that it should have a melting point which will be in excess of 600° C., the usual sintering temperature.

The lead-tellurium alloy powder is used as 5 to 40% by weight of the powder which is sintered to form the bearing material. Usually, the other metal powder will be iron and/or nickel powder, although other metals may, of course, be used.

The bearing materials of the present invention have a low wear rate, not only when in continuous use but also when used in apparatus subjected to repeated start-ups during lubrication is not at its maximum level.

The following example is given by way of illustration only:

*Example*

Two sintered metal bearings, each with an internal diameter of 25 mm. and a length of 19 mm. were made, one from pure nickel powder and the other from a powder mixture of 70% by weight of nickel and 30% by weight of a lead-tellurium alloy containing 62% lead. Each bearing was impregnated with an oil having a viscosity of 27 centistokes at 80° C.

A shaft was placed in each of the bearings and rotated at 3000 r.p.m. Pressure was exerted on the bearing until seizure occurred, and the pressure at which this occurred was used to calculate the limiting PV value for each of the bearings, P being the pressure in bars at which seizure occurs with that bearing and V being the peripheral velocity of the shaft in metres per second.

For the first bearing, that is, the pure nickel bearing, PV was 55 and for the second it was 120, thus demonstrating that the pressure on the bearing can be more than doubled before seizure takes place.

What I claim is:
1. A low friction bearing material of fine porosity comprising a sintered metal powder mixture, the powder mixture comprising 5 to 40% by weight a powdered lead-tellurium alloy containing 55 to 75% by weight of lead, and at least one other powdered metal having a melting point higher than that of the lead-tellurium alloy.
2. A material according to claim 1, in which the lead-tellurium alloy contains about 62% by weight of lead.
3. A material according to claim 1, in which the grains of the powder mixture have a diameter of less than 10 microns.

4. A low friction bearing material of fine porosity comprising a sintered metal powder mixture, the mixture comprising 5 to 40% by weight of powdered lead-tellurium alloy containing 55 to 75% by weight of lead and 95 to 60% by weight of at least one powdered metal selected from the group consisting of iron and nickel.

5. A material according to claim 4, in which the lead-tellurium alloy contains about 62% by weight of lead.

6. A material according to claim 4, in which the lead-tellurium alloy also contains up to 10% by weight of a metal selected from the group consisting of tin, bismuth and antimony.

References Cited by the Examiner
UNITED STATES PATENTS
2,811,571  12/1954  Fritts et al. _____ 75—166 X FOREIGN PATENTS
449,372  6/1936  Great Britain.
765,884  1/1957  Great Britain.

CARL D. QUARFORTH, Primary Examiner.
BENJAMIN R. PADGETT, Examiner.
A. J. STEINER, Assistant Examiner.